Patented Nov. 3, 1925.

1,560,379

UNITED STATES PATENT OFFICE.

LEOPOLD DARIMONT, OF BRUSSELS, BELGIUM.

PRIMARY BATTERY.

No Drawing.   Application filed August 23, 1920.   Serial No. 405,323.

*To all whom it may concern:*

Be it known that I, LEOPOLD DARIMONT, a subject of the King of Belgium, and resident of Brussels, Belgium, have invented certain new and useful Improvements in Primary Batteries, of which the following is a specification.

My present invention relates to a two-fluid primary battery or cell, wherein the fluids are separated by means of a porous diaphragm, the negative pole being a zinc put into the exciter mass, and the positive pole being a retort carbon put into the depolarizer fluid.

If in a cell of this kind a solution of chloride of sodium is used as exciting liquid and a solution of perchloride of iron as depolarizer, a rather intense current will be produced, but the cell will be quickly out of use because the solution of perchloride of iron filtering through the porous vessel will after a short lapse of time produce an insulating deposit upon the zinc electrode, whereby the cell becomes useless. In order to avoid this disadvantage due on the diffusion of the two solutions, and to provide a practical cell, I proceed as follows:

To the exciter solution, I add: (a) some non-acid insoluble powder such as calcium carbonate, in order to form with the perchloride of iron an insoluble compound which will be deposited on the wall of the porous vessel, whereby a semi-pervious layer is formed preventing the diffusion of the two solutions. (b) an agglutinative substance, in order to maintain said powder in suspension in the exciting solution.

To the depolarizing fluid, I add chloride of sodium in order to prevent a prejudicial deposit of iron hydrate upon the carbon, said hydrate being contained as impurities in the perchloride of iron (said addition serving at the same time to increase the conductivity of the diluted depolarizing solution and to permit the regulation of the osmotic pressure.)

In order to increase the electric capacity of the depolarizer fluid, there may be added chromic acid ($CrO_3$) or other chromic salts, with addition of an hydrochloride, said addition permitting the deposited insoluble compound (or semi-pervious layer) being maintained in a proper thickness.

The non-acid exciter mass comprises a mixture of exciter salt, non-acid powder, preferably insoluble, and agglutinating substances. The exciter salt is formed of—

(a) Chloride of sodium ($NaCl$) or any other exciting salt.

(b) Insoluble non-acid powder is formed according to my invention of calcareous or earth-like materials or a mixture or combination of same, such as calcium carbonate ($CaCO_3$), lime ($CaH_2O_2$), barium carbonate ($BaCO_3$), basic or neutral calcium phosphate ($Ca_3P_4O_8$), dolomite or any other mixture or substance capable of decomposing chloride of iron.

(c) The agglutinating material is formed of vegetable or animal substances, used individually or mixed together, or any other substance capable of forming a pasty adhesive gelatinous starchy or sirup-like mass or emulsion, such as starch, rye, wheat or other flour, potato-starch, arrow root and the like, or jelly of lichen, dextrine and the like, gelatine, sirup of sugar, molasses and the like or bone-glue, hide-glue et cetera or gelatinous silicate or silica, paper-pulp or cellulose.

The three different kinds of substances will be mixed in any desired way and in any proportion, the finished mass being prepared in a hot or cold way as desired.

(d) Oxide of alumina, clay, kaolin, marl or the like may be preferably added for absorbing moistness, and for rendering the mass less viscous and for permitting the disengagement or escape of the gas, and (e) I also contemplate the use of antiseptic antiferment and like substances such as formic aldehyde and the like.

For instance, the mixture may be composed as follows: 125 grams of chloride of sodium; 300 grams of powdered calcium carbonate; 60 grams of flour of rye, wheat or the like; ½ liter of water.

These substances will be thoroughly mixed and a little boiled, or it may be composed as follows: 600 grams of chloride of sodium; 25 grams of vegetable glue; 200 grams of flour of rye, wheat or the like; 600 grams of non-acid material such as $CaCO_3$; 200 grams of kaolin; 2 liters of water.

These substances will be thoroughly mixed, a little boiled and mixed with a small quantity of formic aldehyde or any other antiferment or antiseptic substance.

According to my invention, the depolarizer used is formed of a mixture of (a) salt capable of yielding two atoms of chlorine and recovering the same in a current of chlorine, such as perchloride of iron $Fe_2Cl_6$, (b) and salt capable of precipitating hydrate of iron, such as chloride of sodium, whereby moreover the conductivity of the diluted solution and the regulation of the osmotic pressure will be permitted.

For instance, I take 400 grams of perchloride of iron and 25 grams of chloride of sodium, in any desired state, dissolved in 350 centiliters of water, the solution being used in this state or diluted with salt water. It is obvious that the proportions may be varied as desired.

Furthermore, I may add chromic acid ($Cr.O_3$) or any other chromate salt and hydrochlorid acid for the purpose of increasing the electrical capacity of the depolarizer, and maintaining the semi-pervious layer in a proper thickness.

The cell is charged as follows:

The exciter mass is introduced into the part containing the zinc electrode and the more or less diluted depolarizer solution is introduced into the part containing the carbon electrode.

Exhausted depolarizer solution, that is chloride of iron ($FeCl_2$) may be regenerated by combining the two molecules of chlorine which it lost previously with the same according to the equation:

$$2FeCl_2 + 2Cl = Fe_2Cl_6.$$

The cell described has an electro-motive force of 1.50 volts, its current is constant, it has an inner resistance of 0.2 ohm. and a capacity corresponding to the concentrated depolarizer solution used for 96 ampere-hour per liter. When the circuit is open, the zinc of the electrode will not be consumed and the same must not be amalgamated.

The cell is odorless and no prejudicial gases escape from the same. The solutions do not diffuse. The consumption of zinc is about 0.90. grams per watt-hour. The cell is suitable for any desired purpose, either for closed circuit or open circuit, such as bells, signals, telegraphy, telephony, radio-telephony, electro-medical devices, small continuous lighting plants and the like.

Having now fully described my said invention, what I claim and desire to secure by Letters Patent, is:

A primary battery having an exciter mass consisting of an exciter proper, an anti-acid substantially insoluble powder capable of decomposing ferric chloride, and an agglutinating substance for emulsioning the anti-acid powder, said primary battery also including a depolarizer composed of ferric chloride, a chromic compound for increasing the electrical capacity of the depolarizer, and a solution of sodium chloride for increasing the conductivity of the diluted solution of ferric chloride and for regulating the osmotic pressure.

In testimony whereof I have hereunto set my hand.

LEOPOLD DARIMONT.